Dec. 24, 1940.  W. S. PRAEG  2,226,018
MACHINE FOR SHAVING GEAR SEGMENTS
Filed March 21, 1938   4 Sheets-Sheet 2

INVENTOR
WALTER S. PRAEG
BY
Whittemore Hulbert & Belknap
ATTORNEYS

Dec. 24, 1940.  W. S. PRAEG  2,226,018
MACHINE FOR SHAVING GEAR SEGMENTS
Filed March 21, 1938  4 Sheets-Sheet 3

INVENTOR
WALTER S. PRAEG
BY
Whittemore, Hulbert & Belknap
ATTORNEYS

Dec. 24, 1940.   W. S. PRAEG   2,226,018
MACHINE FOR SHAVING GEAR SEGMENTS
Filed March 21, 1938   4 Sheets-Sheet 4
FIG.4
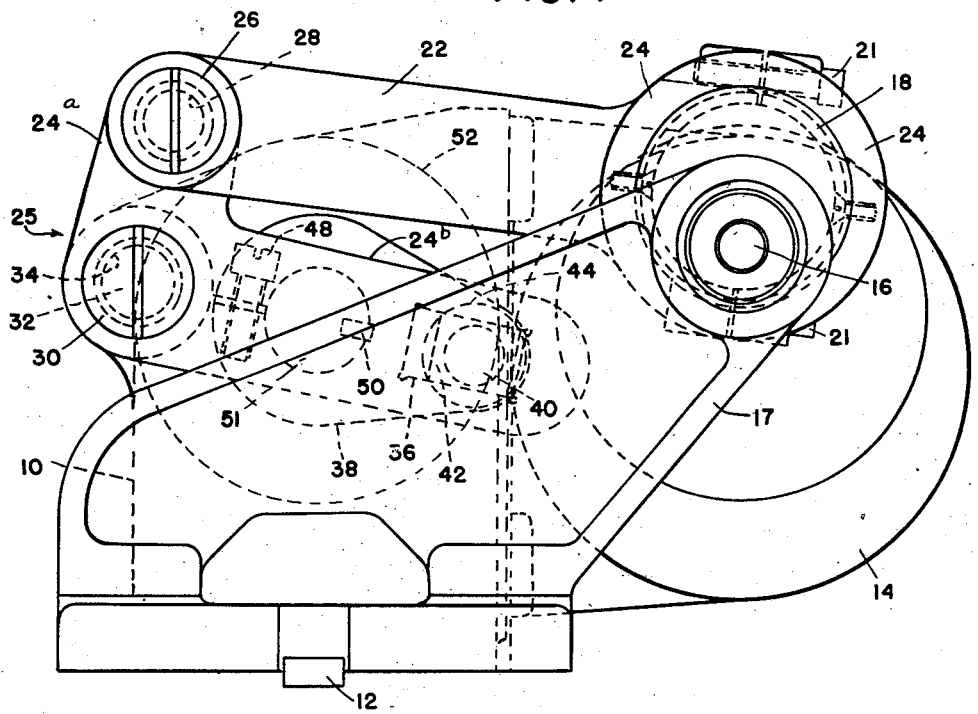
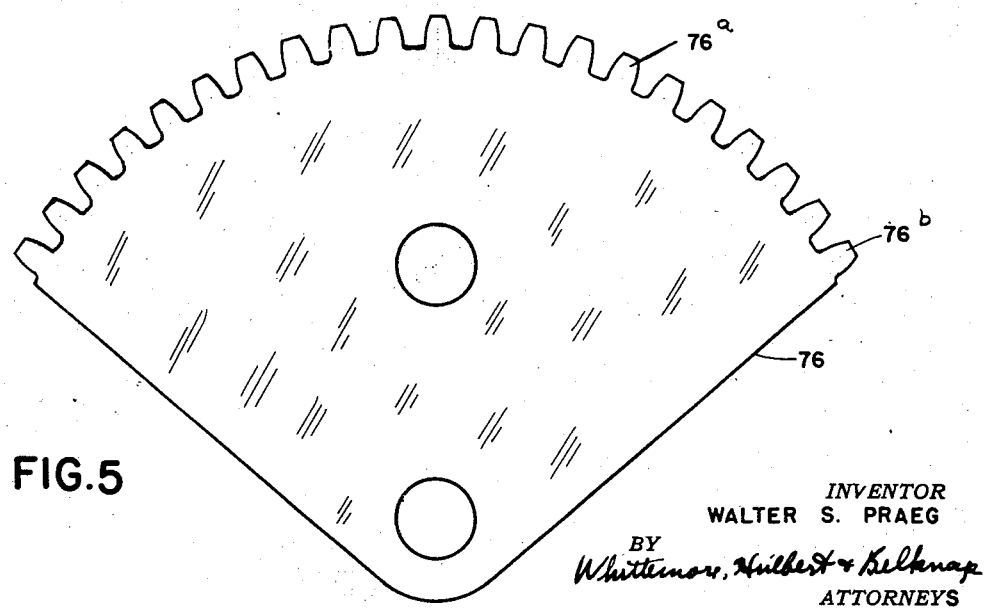
FIG.5
INVENTOR
WALTER S. PRAEG
BY
Whittemore, Hulbert & Belknap
ATTORNEYS Patented Dec. 24, 1940

2,226,018

UNITED STATES PATENT OFFICE 2,226,018

MACHINE FOR SHAVING GEAR SEGMENTS

Walter S. Praeg, Detroit, Mich., assignor to National Broach & Machine Company, Detroit, Mich., a corporation of Michigan Application March 21, 1938, Serial No. 197,274

2 Claims. (Cl. 90—2)

This invention relates to a machine for finishing gear segments which have been fashioned by any suitable means such, for example, as by hobbing.

The principles involved in the present machine are quite similar to the principles involved in the gear finishing machine disclosed in a pending application for patent by Robert S. Drummond, entitled "Machine for cutting gears," Serial No. 3,662, filed January 26, 1935. In this type of machine, a finishing tool in the form of a gear is provided and is adapted to be run in mesh with the gear to be finished. The finishing tool and the gear to be finished are positioned with their axes lying in no common plane and crossed at an angle less than 30°. The finishing tool has a plurality of parallel serrations extending generally up and down the faces of the teeth. As more fully disclosed in the above mentioned application, rotation of the finished tool and the gear to be finished results in a plurality of fine cuts being taken progressively across the face of the teeth of the gear to be finished.

The operation above described is normally carried on at relatively high speed. As is of course obvious, where the work piece to be finished is in the form of a complete gear, both the work piece and the finished tool may be continuously rotated for substantial periods of time. The problem presented and solved by the machine disclosed in the present application is quite different. Since the work piece to be finished is only a segment of a gear, it is abviously impossible to provide for continuous rotation of the parts. I have found that by mounting the tool for free rotation, meshing the tool with the segmental gear, and oscillating the segmental gear rapidly between predetermined limits, I am enabled to finish the teeth of the gear segment accurately and rapidly.

Accordingly, it is an object of the present invention to provide a finishing machine adapted to finish incomplete gears or gear segments.

It is a further object of the invention to provide an improved power head stock for use in a gear finishing machine.

It is a further object of the invention to provide an improved power head stock upon which is mounted motor means.

It is a further object of the invention to provide a power head stock with primary means associated therewith adapted to oscillate the head stock between predetermined limits.

Other objects of the invention will be apparent as the description proceeds, and when taken in conjunction with the accompanying drawings wherein Fig. 1 is a perspective showing a gear finishing machine including my improved power head stock;

Fig. 4 is a front elevation with parts broken away for clearness.

Fig. 5 is an elevation of a gear segment of the type finished in my improved machine.

Figure 1:
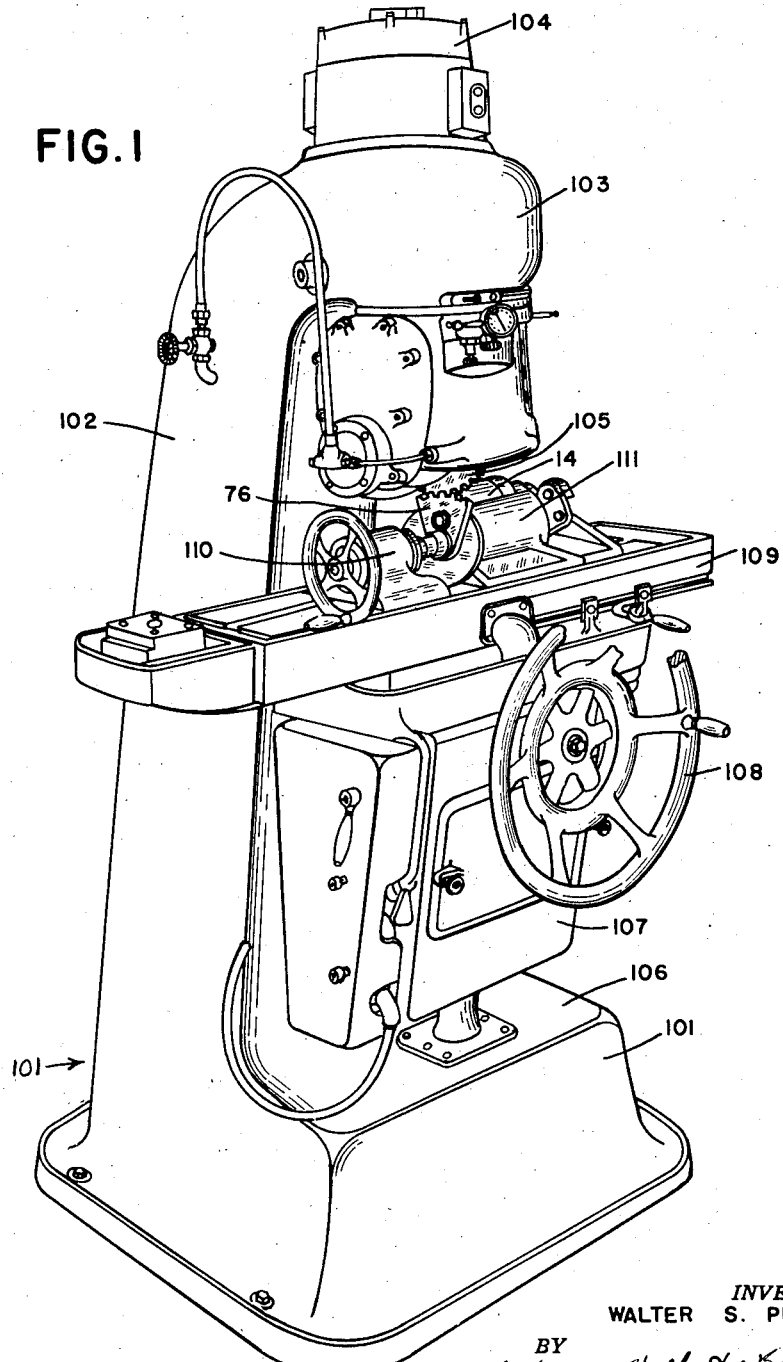

In Fig. 1 I have illustrated a complete machine including my improved head stock for finishing segmental gears except for the head stock itself which will be described in detail. This machine is in all respect similar to the improved gear finishing machine disclosed in Drummond application Serial No. 3,662, referred to above.

In this machine, a main frame 101 is provided with an upright pedestal 102 and an overhanging tool supporting head portion 103. Motor means, indicated generally at 104, are provided at the top of the tool supporting head and are adapted through suitable mechanism (not shown) to rotate a tool spindle which supports a gear cutting tool 105. The frame 101 includes a forwardly projecting knee 106 and above this knee is mounted for vertical feed a table 107. Suitable mechanism (not shown in this application and for a further disclosure of which see the Drummond application referred to above) is provided for elevating the table 107 along vertical ways provided in the frame 101. This means may be manual and controlled, for example, by the hand wheel 108 or may be automatic and controlled by suitable motor means included within the frame of the machine.

Carried by the table 107 is a carriage 109 which is mounted in transverse ways at the top of the table 107. Suitable automatic mechanism is provided for reciprocating the carriage 109. Mounted on the carriage and movable therewith is a tail stock 110 and a head stock of novel design 111.

A segmental gear member is mounted between tail stock 110 and head stock 111 so that the toothed portion is in mesh with the finishing tool 105. Rotation of the motor 14 causes rapid oscillation of the segmental gear member about its axis and between limits such that each tooth of the segmental gear meshes with teeth on the gear finishing member 105.

When the gear finishing machine is used in finishing segmental gears, it will be understood that the motor means 104 which are normally used to positively drive the finishing tool 105 are disconnected, with the result that the finishing tool 105 is rigidly supported in predetermined position but is mounted for free rotation about its axis.

Figure 2:
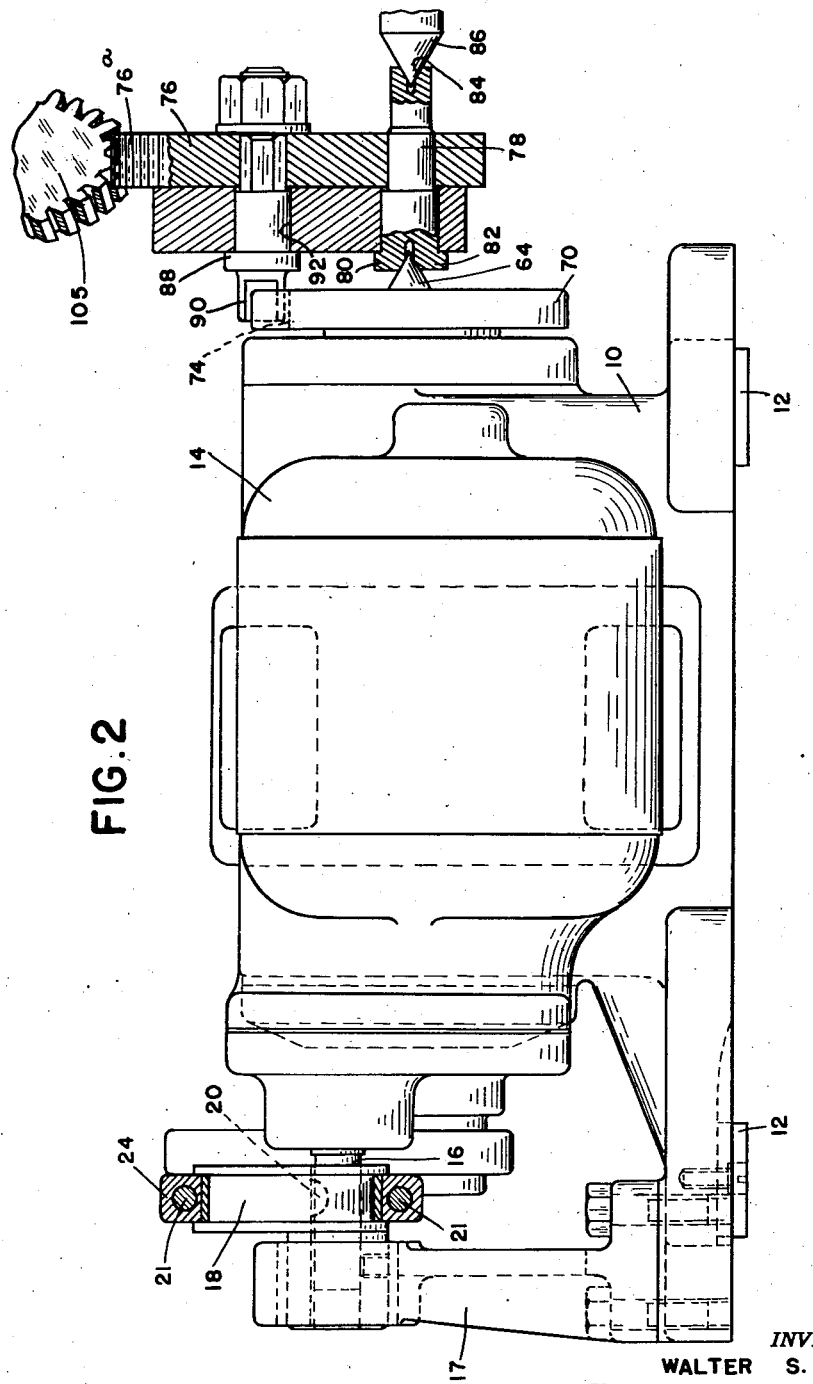
Fig. 2 is a side elevation of my improved head stock.
Figure 3:
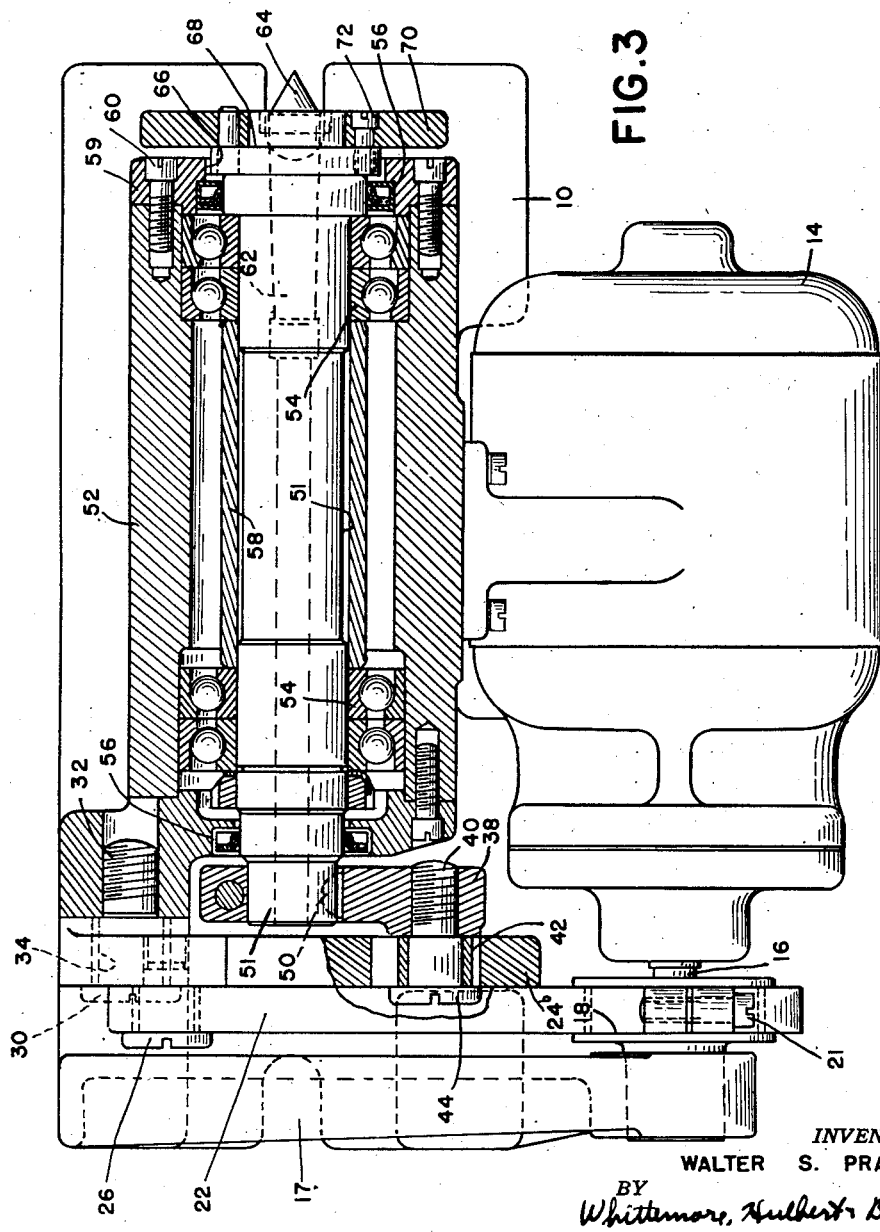
Fig. 3 is a plan of my improved head stock with parts in section.

As shown in Figs. 2 to 4, my improved head stock comprises a frame 10 mounted on the carriage 109, keys 12 being provided to allow for adjustment of the head stock relative to the carriage. Supported by and movable with the frame 10 is a motor 14 which has a shaft 16 connected thereto. Shaft 16 has its other end journaled in bracket 17. An eccentric 18 is mounted on the shaft 16 and is keyed thereto, as indicated at 20. A connecting rod 22 having a two-piece eccentric embracing bushing 24 which is secured in assembled position by bolts 21 is adapted to interconnect the eccentric 18 and a bell crank 25. The bell crank 25, as shown, comprises two right angularly related arms 24a and 24b. The connecting rod 22 is connected to arm 24a by means of a pin 26 which passes through registering apertures 28 in the connecting rod and arm 24a. The bell crank 25 is mounted for pivotal movement to the frame 10 by means of a pin 32 which passes through aperture 34 in the bell crank 25 and which is provided with a head 30 to retain the bell crank in proper position.

The arm 24b of the bell crank 25 is provided at its free end with an elongated, rectangular slot 36. The spindle 51 has secured thereto, as by means of a key 50, a crank 38, to the free end of which is secured, as by means of the bolt 40 having a head 44, a rectangular bushing 42 which is slidably received within the rectangular slot 36. As will be apparent from a consideration of the structures just described, rotation of the motor will result in oscillation of the shaft 51 between predetermined limits. The frame 10 is provided with a spindle housing 52. The spindle 51 is supported within the housing by suitable bearings 54 provided with a spacer 58. The spindle 51 is provided at one end with a centering pin 64, the centering pin having a tapered body portion 62 for reception within the spindle. The spindle 51 is also provided with an annular projection 68 which is received within an aperture 66 in cap plate 59 secured to the open end of housing 52. An annular driving member 70 is secured to the annular projection as by bolts 72 and is provided peripherally with a groove 74 (see Fig. 2) for a purpose which will presently appear.

The head stock, as just described, is adjustable toward and away from the tail stock 110, the tail stock also being adjustable along the same path. The segmental gear shown in Fig. 2 is positioned between centers 84 of the head stock and 86 of the tail stock, a spindle 78 being provided for this purpose. Spindle 78 is provided at its ends with recesses 82 and 84 for reception of the centers. In order to provide positive means for oscillating the work piece 76, a member 88 is provided for engagement therewith having a laterally projecting portion provided with flat sides 90 for reception in the peripheral slot 74 previously described. In Fig. 2 I have illustrated a portion of the helical tool in mesh at crossed axes relationship.

From the foregoing the operation of my improved segmental gear finishing machine will be readily understood. The segmental gear to be finished is mounted between centers 84 and 86 and is positively connected to primary spindle 51 by means of the member 88. Rotation of the motor 14 results in oscillation of the bell crank 25 about its axis and a corresponding oscillation is transmitted to crank 30. Oscillation of the crank 30 is imparted to spindle 51 and driving plate 70 and through the member 88 is finally transmitted to the segmental gear to be finished.

It is to be understood that this oscillation takes place at high speed. Satisfactory results have been obtained in tests when operating between 250 and 500 oscillation per minute.

The operation of the machine in general is parallel to the operation of my improved complete gear finishing machine as described in Drummond application No. 3,662, referred to above. The carriage 109 during the rapid oscillation of the segmental gear is translated either manually or automatically along horizontal ways. This translation is necessary to distribute the finishing action across the faces of the teeth of the segmental gear. This translation is limited in amount so that the finishing tool and the segmental gear are always in firm mesh. At the end of each reciprocation and either automatically or by manual manipulation of wheel 108, the table 107 is elevated by a predetermined increment. This results, during the next translation of carriage 109, in a finishing cut of predetermined depth being taken across the faces of the teeth of the segmental gear. As disclosed in the Drummond application referred to, these movements may be controlled automatically and it is to be understood further that suitable automatic mechanism may be provided for timing complete operation. Thus, for example, mechanism may be provided which will cause the carriage 109 to make any predetermined number of complete reciprocations and then come to a stop.

The shaving machine operating as described on a segmental gear finishes the intermediate teeth 76a uniformly rapidly and within narrow limits of accuracy as to tooth spacing, tooth thickness and tooth profile. In this type of gear finishing machine the teeth of the cutter are engaged simultaneously on both sides between teeth of the work gear being finished. This contact serves to guide the cutter accurately and contributes largely to the extreme accuracy of the result. However, in finishing segmental gears, as will be readily apparent, when the end tooth 76b of the segment is meshed between teeth of the cutter, there is less support for the cutter and as a result the end teeth are left somewhat thicker than the intermediate teeth. This increased thickness is largely accounted for by the fact that the cutter removes less metal from the outside face of the end teeth. In normal operation, this surface of the end tooth is not engaged and the fact that the end tooth is thicker is of material advantage, since this tooth takes increased strain due to reversal of the parts during its engagement.

What I claim as my invention is:

1. In a gear finishing machine of the character disclosed, a power head stock assembly comprising a work spindle mounted for rotation, a motor, an eccentric driven by said motor, a connecting rod driven by said eccentric, a crank carried by said spindle, and a bell crank pivoted intermediate its ends and interconnecting said connecting rod and crank.

2. In a gear finishing machine of the character disclosed, a power head stock assembly comprising a work spindle mounted for rotation, a motor, an eccentric driven by said motor, a connecting rod driven by said eccentric, a crank carried by said spindle and a bell crank pivoted intermediate its ends and interconnecting said connecting rod and crank, said elements being constructed and arranged to provide oscillations between predetermined limits of said spindle.

WALTER S. PRAEG.